United States Patent [19]

White

[11] Patent Number: 4,844,990
[45] Date of Patent: Jul. 4, 1989

[54] FLUORESCENT WRITING SURFACE

[76] Inventor: Harry O. White, 816 Jack London Dr., Santa Rosa, Calif. 95405

[21] Appl. No.: 114,078

[22] Filed: Oct. 27, 1987

[51] Int. Cl.$^4$ ............. B32B 9/00; G09F 13/20; H01T 19/04
[52] U.S. Cl. .................... 428/690; 428/81; 428/192; 428/203; 428/912.2; 40/542; 40/615; 250/324
[58] Field of Search ............ 250/324; 428/1, 690, 428/35, 81, 192, 203, 912.2; 40/542, 615; 434/408

[56] References Cited

U.S. PATENT DOCUMENTS

| | | | |
|---|---|---|---|
| 2,650,169 | 8/1963 | Goldstein | 428/690 |
| 2,907,882 | 10/1959 | Patten | 428/690 |
| 3,935,455 | 1/1976 | Bogaert | 250/324 |
| 3,969,624 | 7/1976 | Van Biesen et al. | 378/31 |
| 4,030,922 | 6/1977 | Honjo et al. | 355/3 R |
| 4,192,091 | 3/1980 | Hanes | 40/615 |

Primary Examiner—Ellis P. Robinson
Assistant Examiner—P. J. Ryan
Attorney, Agent, or Firm—Larry D. Johnson

[57] ABSTRACT

A display surface for long-lasting fluorescent markings comprises a generally planar sheet of colored fluorescent film which is electrostatically charged and placed against one (front) side of a clear plastic panel member, with an airtight seal created between the two. The back side of the clear plastic panel is similarly electrostatically charged and placed against a sheet of photoreflective film, again with an airtight seal created between the two. The reflective surface of the photoreflective film is oriented outward towards the clear plastic panel and fluorescent film. These assembled layers are then sealed around their perimeter edges to prevent introduction of air and to preserve the induced electrostatic charges. The layers can then be mounted on a mounting board or other suitably strong, rigid material to enable them to be used as a writing surface, preferably with fluorescent-type writing markers such as pens or crayons.

3 Claims, 1 Drawing Sheet

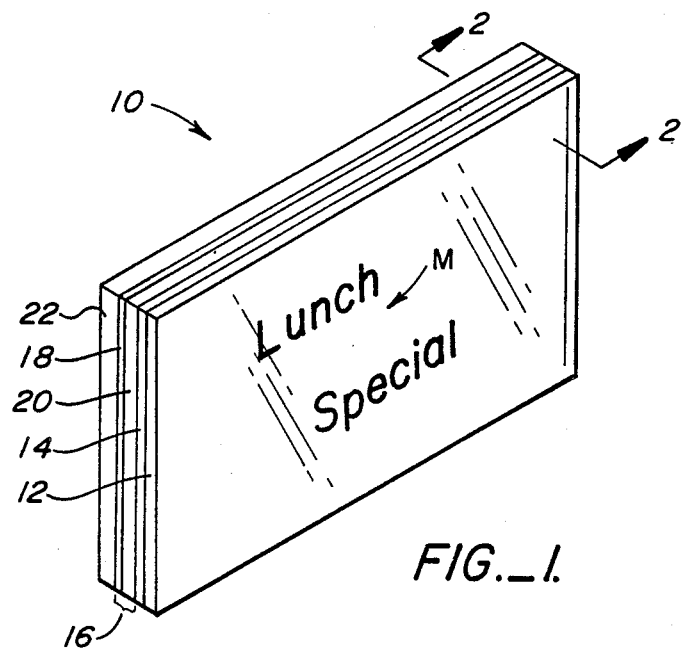
FIG._1.
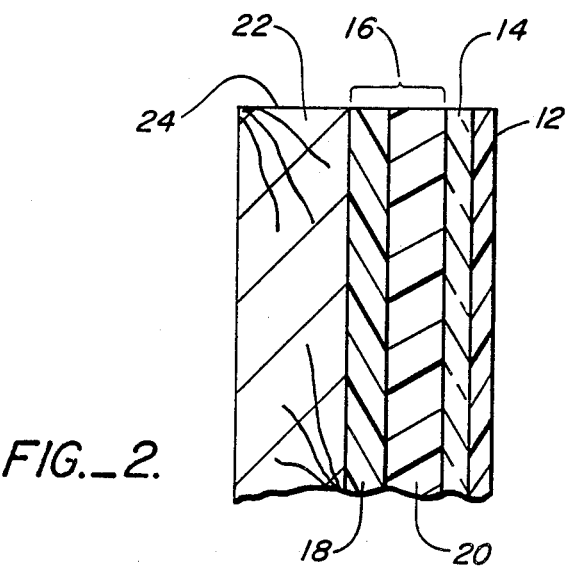
FIG._2.

FLUORESCENT WRITING SURFACE

BACKGROUND OF THE INVENTION

1. Field of the Invention

This invention relates generally to writing surfaces and implements, and more specifically to an improved fluorescent writing surface.

2. Description of the Prior Art

Numerous signs, chalkboards, billboards, and other writing surfaces have been developed to conveniently display a written message. Some such signs now utilize fluorescent film and/or fluorescent writing instruments to cause the applied markings to "glow" (fluoresce), and therefore stand out with greater contrast. However, most such fluorescent signs require an internal power supply or external electrical outlet for power to energize a light source or other excitation means to cause the markings to fluoresce. Other known fluorescent signs do not require such a light source, but rather rely on the impressed mechanical contact caused by manually writing upon and depressing two adjacent fluorescent surfaces together to produce the fluorescent effect. Unfortunately, this latter arrangement yields a poor-quality and relatively temporary fluorescence, and thus is not suitable for many applications.

SUMMARY OF THE INVENTION

The fluorescent writing surface of this invention provides a display surface for long-lasting fluorescent markings. The writing surface comprises a generally planar sheet of colored fluorescent film having a back surface which is electrostatically charged and placed against one (front) side of a clear plastic panel member, with an airtight seal created between the two. The other (back) side of the clear plastic panel may be coated with a dye complementary in color to the color of the fluorescent film being used. This back side of the clear plastic panel is similarly electrostatically charged and placed against a sheet of photoreflective film, again with an airtight seal created between the two. The reflective surface of the photoreflective film is oriented outward towards the clear plastic panel and fluorescent film. These assembled layers are then sealed around their perimeter edges to prevent introduction of air and to preserve the induced electrostatic charges. The layers can then be mounted on a mounting board or other suitably strong, rigid material to enable them to be used as a writing surface, preferably with fluorescent-type writing markers such pens or crayons.

BRIEF DESCRIPTION OF THE DRAWINGS

FIG. 1 is a perspective view of a fluorescent writing surface of this invention, with an arbitrary message written on its front surface; and FIG. 2 is a cross-sectional view of a fluorescent writing surface of this invention, the view being taken along line 2—2 of FIG. 1.

DETAILED DESCRIPTION OF A PREFERRED EMBODIMENT

FIG. 1 is a perspective view of a fluorescent writing surface 10 of this invention, with an arbitrary message M ("Lunch Special") written on its front surface. Fluorescent writing surface 10 comprises a plurality of assembled layers of material that have been electrostatically charged and sealed together to form an air-tight, unitary member. The electrostatic charging can be accomplished, for example, by vigorous rubbing of the respective surfaces with a cloth before assembly. Tight sealing of the respective layers together, and sealing of their perimeter edges, helps prevents loss of this electrostatic charge, and further prevents the introduction of air between the assembled layers, both of which effects have been found to dissipate the fluorescent capability of the writing surface.

Outermost of the assembled layers is a layer of fluorescent film 12, which physically carries the written message M on its outside surface. Fluorescent film 12 is readily available in a variety of colors, including red, orange, yellow, green, and blue. Beneath the fluorescent film 12 is a clear plastic panel member 14, which is itself sealed against a photoreflective or mirrored layer 16. This photoreflective layer may be a single layer of reflective film 18 or, alternatively, include a clear sheet 20 of vinyl or other material between it and the clear plastic panel 14, to create more depth and three-dimensionality to the reflected image. A mounting board 22, such as wood, metal, cardboard, or heavy plastic, supports the assembled layers in a fashion suitable for a sign or billboard.

FIG. 2 is a cross-sectional view of a fluorescent writing surface 10 of this invention, this view being taken along line 2—2 of FIG. 1. Here, photoreflective layer 16 can be seen to comprise purely reflective film 18 backing a clear (transparent) vinyl sheet 20. Mounting material 22 backs all of the assembled layers, and provides rigidity to the writing surface. The assembled layers may be sealed along their collected perimeter edges by air-tight sealing member 24, preserving the electrostatic charge and preventing air from entering the assembly.

While this invention has been described in connection with preferred embodiments thereof, it is obvious that modifications and changes therein may be made by those skilled in the art to which it pertains without departing from the spirit and scope of the invention. For example, while the fluorescent writing surface of this invention does not require enhancement or image excitation by an outside light source, such a light source may be employed to amplify the fluorescent image. Accordingly, the scope of this invention is to be limited only by the appended claims.

What is claimed as invention is:

1. A fluorescent writing surface comprising:
    a layer of fluorescent film having a front surface and a back surface, and a perimeter edge, said back surface being electrostatically charged;
    a layer of clear plastic having a front surface and a back surface, and a perimeter edge, said plastic layer front surface being sealed against said fluorescent film layer back surface, and said plastic layer back surface being electrostatically charged;
    a layer of photoreflective film having a front surface and a back surface, and a perimeter edge, said photoreflective film front surface being sealed against said plastic layer back surface; and
    an air tight sealing member sealing said fluorescent film layer perimeter edge, said plastic layer perimeter edge and said photoreflective film layer perimeter edge together.

2. The fluorescent writing surface of claim 1 wherein said photoreflective film layer comprises a layer of reflective film and a layer of clear film.

3. The fluorescent writing surface of claim 1 wherein said photoreflective film back surface is attached to a rigid mounting frame.

* * * * *